United States Patent
Xu et al.

(10) Patent No.: US 8,400,042 B2
(45) Date of Patent: Mar. 19, 2013

(54) RIPPLE SPRING

(75) Inventors: James Jun Xu, Niskayuna, NY (US); Elena Rozier, Schenectady, NY (US); Thomas Robert Stonehouse, Clifton Park, NY (US); Lawrence Lee Sowers, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 31 days.

(21) Appl. No.: 13/163,781

(22) Filed: Jun. 20, 2011

(65) Prior Publication Data

US 2012/0319525 A1    Dec. 20, 2012

(51) Int. Cl.
*H02K 3/48* (2006.01)
(52) U.S. Cl. .................. 310/214; 310/215; 310/43
(58) Field of Classification Search ............. 310/214, 310/215, 43
See application file for complete search history.

(56) References Cited

U.S. PATENT DOCUMENTS

| | | | |
|---|---|---|---|
| 3,909,931 A | 10/1975 | Lambrecth | |
| 3,949,255 A | 4/1976 | Brown et al. | |
| 4,055,826 A | 10/1977 | Franz | |
| 4,387,316 A | 6/1983 | Katsekas | |
| 4,468,504 A | 8/1984 | Kuemmel | |
| 4,584,497 A | 4/1986 | Butman, Jr. et al. | |
| 5,325,008 A * | 6/1994 | Grant | 310/214 |
| 5,708,315 A | 1/1998 | Gould et al. | |
| 5,822,845 A | 10/1998 | Gould et al. | |
| 6,218,756 B1 * | 4/2001 | Gardner et al. | 310/214 |
| 6,313,561 B1 * | 11/2001 | Nygard et al. | 310/261.1 |
| 6,580,192 B2 * | 6/2003 | Murayama et al. | 310/214 |
| 7,112,909 B2 | 9/2006 | Swartout et al. | |
| 7,852,105 B2 * | 12/2010 | Seeley et al. | 324/765.01 |
| 2005/0284241 A1 * | 12/2005 | Swartout et al. | 73/865.9 |
| 2006/0283234 A1 | 12/2006 | Fischer et al. | |
| 2008/0036336 A1 | 2/2008 | Salem et al. | |
| 2009/0245717 A1 | 10/2009 | Iversen et al. | |

FOREIGN PATENT DOCUMENTS

| | | |
|---|---|---|
| EP | 1408599 A2 | 4/2004 |
| JP | 59136039 | 8/1984 |
| JP | 2009161627 A | 7/2009 |

OTHER PUBLICATIONS

Search Report issued in connection with GB Application No. 1210486.5, Sep. 12, 2012.

* cited by examiner

*Primary Examiner* — Tran N. Nguyen
*Assistant Examiner* — Naishadh Desai
(74) *Attorney, Agent, or Firm* — James W. Pemrick; Ernest G. Cusick; Frank A. Landgraff

(57) ABSTRACT

A ripple spring is provided having one or more layers laminated together, where the one or more layers form a symmetrical stack.

28 Claims, 8 Drawing Sheets

US 8,400,042 B2

RIPPLE SPRING

BACKGROUND OF THE INVENTION

The invention relates generally to electrical machines and in particular, to a ripple spring used in an electrical machine.

Armature windings, also known as stator bar windings, are routinely inspected in electrical power generators, to verify their operation. In some generators, a stator yoke in the generator surrounds an armature core and partially encloses the armature windings. The stator windings are formed from a plurality of copper conductors that are wound in the armature to form loops. The armature windings may be arranged within a stator slot in such a manner that the generator may maintain desired voltage and current characteristics during operation.

Typically, a generator includes a wedge system with ripple springs, to induce a radial or circumferential retaining force to the stator from wedges or ripple springs to facilitate reducing movement of the stator bar windings within the stator slot. However, if the wedge system itself becomes loose or the ripple springs malfunction (e.g., crack), the amount of retaining force is reduced such that the stator bar windings may vibrate during operation. Over time, the relative motion of the stator bar windings cause damage to the insulation surrounding the stator bars and a potential stator bar winding failure may be caused through electrical shorts to ground.

BRIEF DESCRIPTION OF THE INVENTION

In an aspect of the present invention, a ripple spring is provided having one or more layers laminated together, where the one or more layers form a symmetrical stack.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
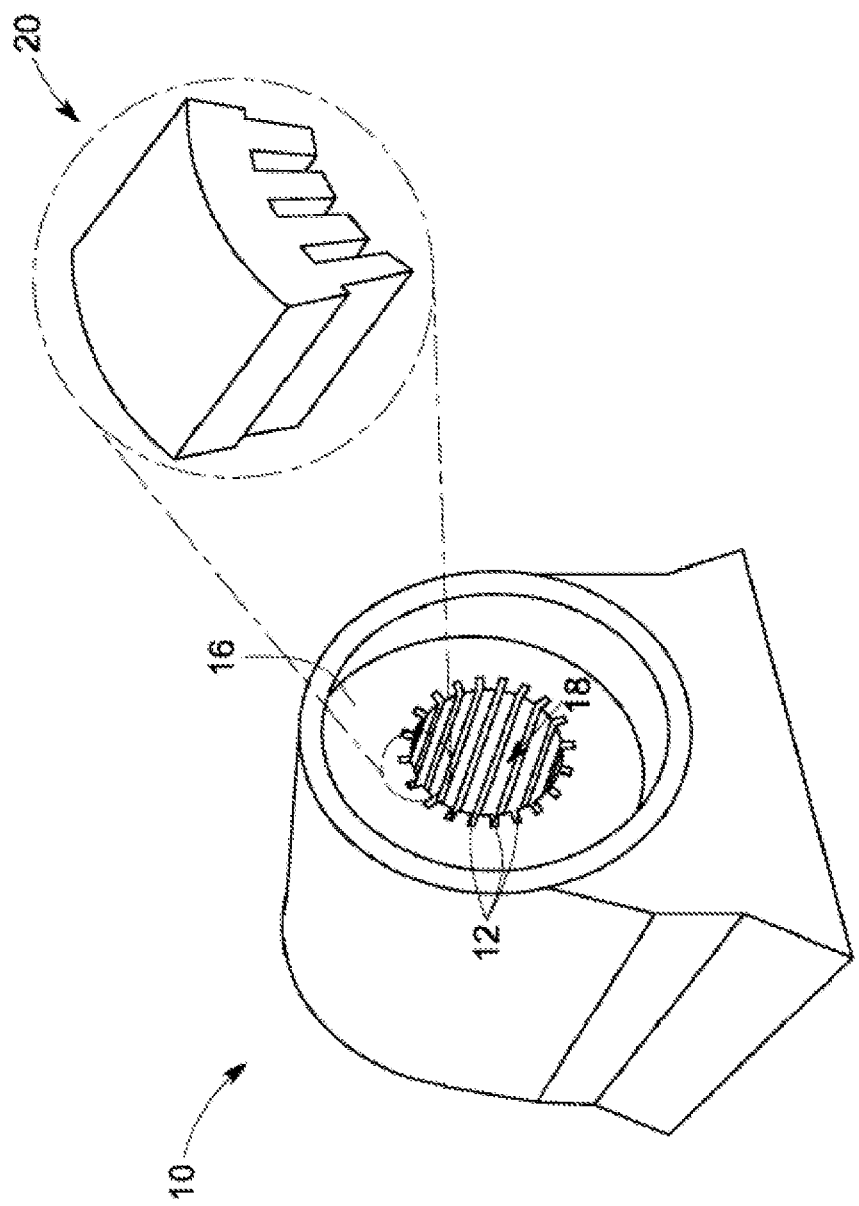
FIG. 1 is a perspective end illustration of an electric machine, according to an aspect of the present invention.

FIG. 1 is a perspective end view of an electric machine 10. The electrical machine 10 includes a core 16 having a plurality of stator slots 12 to accommodate a winding to generate a magnetic flux. The stator slots 12 are configured to accommodate stator windings to be positioned in the stator slots defined around an inner circumference of the core 16 (also referred to as the stator core). The stator bar windings may be formed from a plurality of flat bar conductors or stator bars that are coupled together to form a pre-determined winding path. In one aspect of the invention, the stator bars are fabricated from copper. A rotor (not shown) may be disposed within the stator core 18 where an air or coolant gap is defined between the rotor and stator core 16. A partial, exploded view of the stator is illustrated by the reference numeral 20 that is described in detail with reference to FIG. 2. The electrical machine may be any electrical rotating machine or dynamo-electric machine, including but not limited to a motor or generator.

Figure 2:
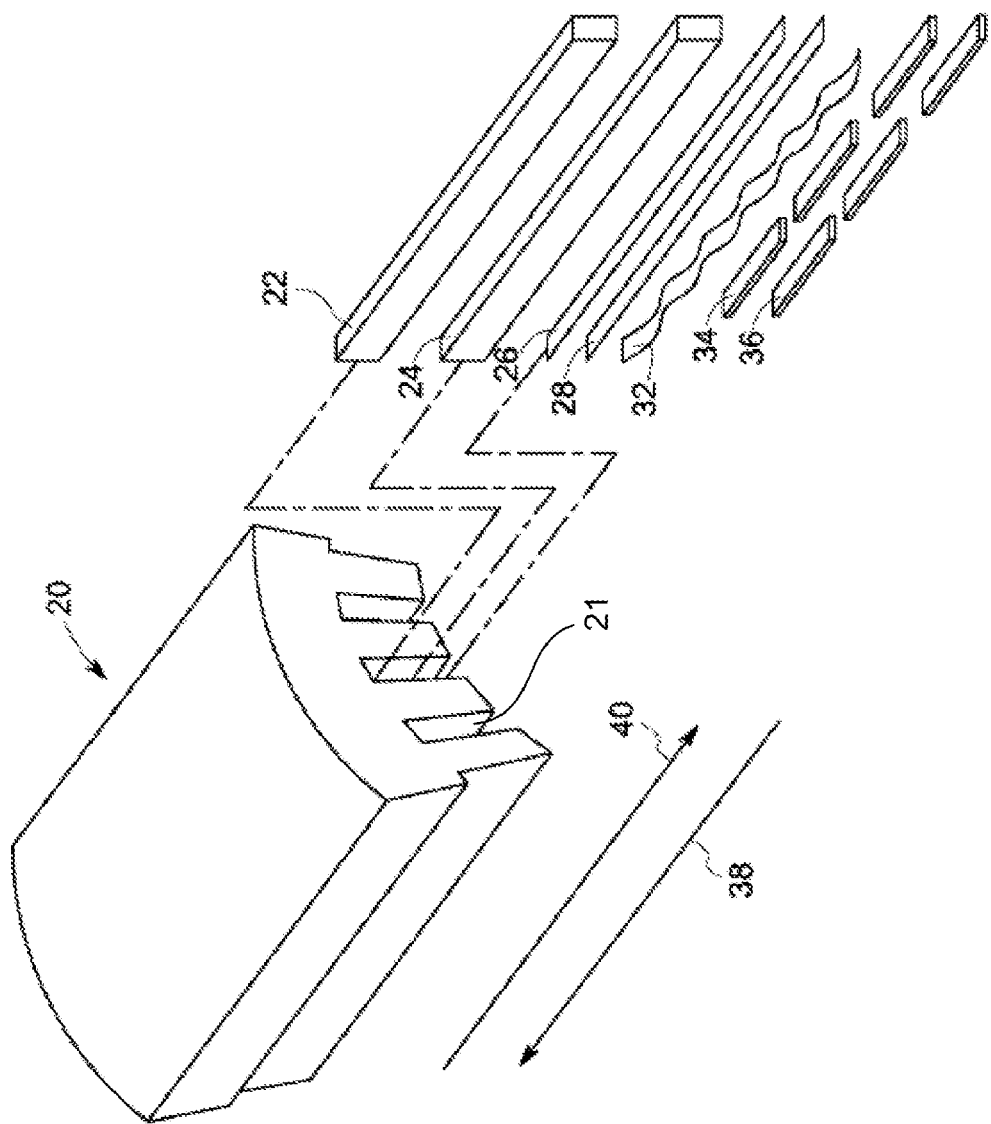
FIG. 2 is a partial exploded illustration of a portion of the electric machine stator shown in FIG. 1, according to an aspect of the present invention.

FIG. 2 illustrates a partial exploded view of a portion of the electric machine 10 of FIG. 1. In one aspect of the invention, the stator 20 includes a bottom stator bar winding 22, a top stator bar winding 24, and one or more slot fillers 26, 28 are positioned at least partially within each stator slot 21. The wedge or retaining system includes a retention device or ripple spring 32. In one aspect of the invention, the retention device includes a ripple spring 32 that is positioned at least partially within stator slot 21 such that the ripple spring 32 is adjacent at to at least one of slot filler 26 or slot filler 28. The ripple spring 32 is then secured in stator slot 21 using a plurality of stator wedge slides 34 and stator wedges 36. The ripple spring 32 may also be replaced with one of the ripple springs 400, 500, 600, 700, and 800 described in more detail hereinafter. For example, moving stator wedge slides 34 in a first direction, indicated by arrow 38, and with respect to stator wedges 36, or moving stator wedges 36 in a second direction, indicated by arrow 40, with respect to stator wedge slides 34, induces restraining pressure to outer stator bar 22 and inner stator bar 24 to facilitate securing outer stator bar 22 and inner stator bar 24 within stator slot 21.

Figure 3:
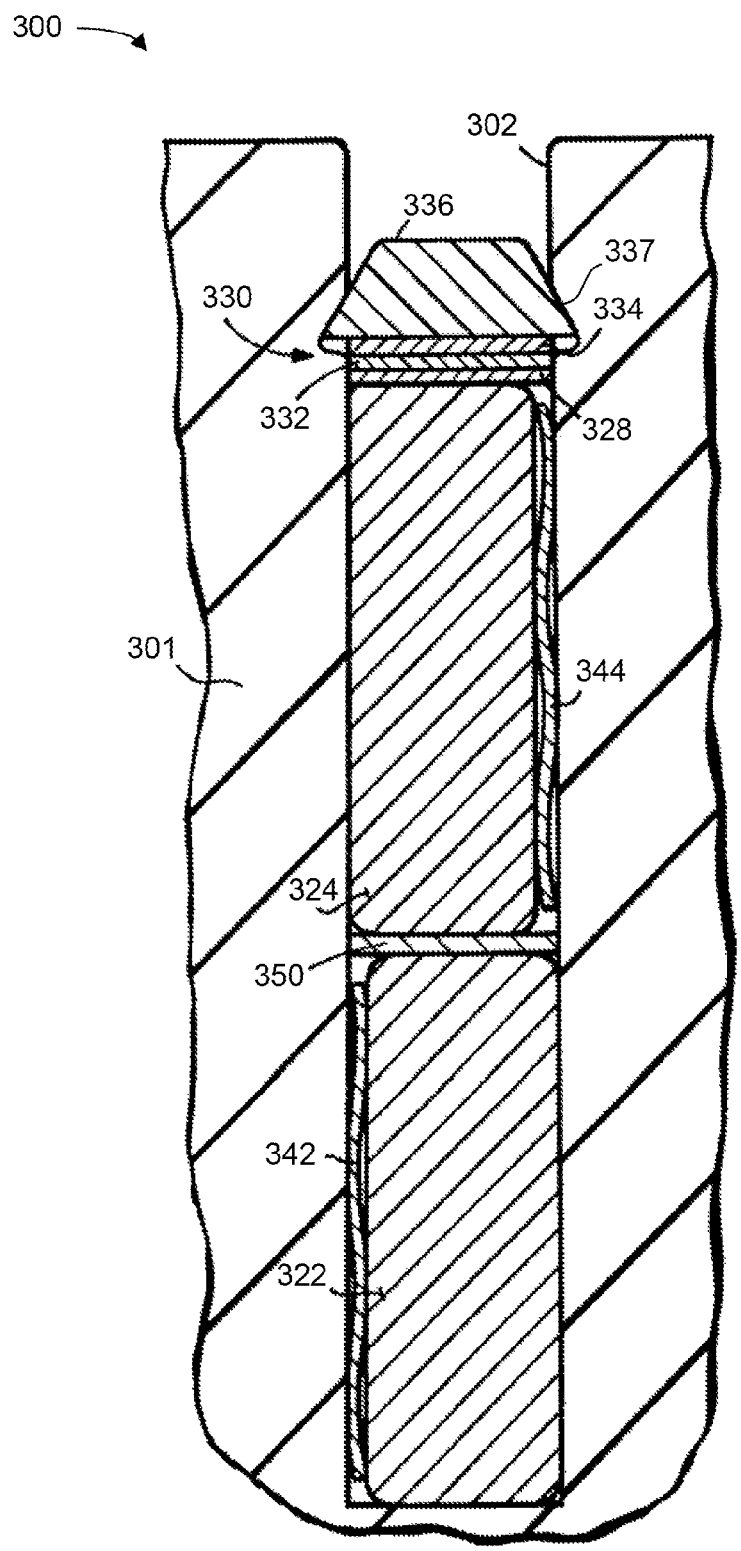
FIG. 3 is a partial cross-sectional illustration of a slot in a stator of an electric machine, according to an aspect of the present invention.

FIG. 3 illustrates a cross-sectional view of a stator slot according to another aspect of the invention. The stator 300 includes a stator core 301 and is part of a dynamoelectric machine or electric machine, such as a motor or a generator. The stator core 301 includes a plurality of radially extending stator slots 302 for housing windings or stator bars 322 and 324. As will be appreciated, the stator core 301 extends around a central axis and the stator slots 302, as well as the stator bars 322 and 324, extend longitudinally parallel to that axis and in a generally radially inward direction. In the illustrated form, side ripple springs 342 and 344 maintain the stator bars 322, 324 firmly against the opposite sides of the stator slot 302. The side ripple springs 342 and 344 may also be replaced with one of the ripple springs 400, 500, 600, 700, and 800 described in more detail hereinafter. Radial space in the stator slots 302 may be taken up by radial fillers 350. A top retention assembly 330 includes stator wedges 336 that extend longitudinally along a radially inner portion of the stator slots 302 with their lateral edges residing in shaped grooves or dovetails 337 formed in the stator slots 302, and a top ripple spring 332 positioned at least partially within stator slot 302 such that the ripple spring 332 is adjacent to at least one slot filler 328. The top ripple spring 332 is then secured in stator slot 302 using a plurality of stator wedge slides 334 and stator wedges 336. The top ripple spring 332 may also be replaced with one of the ripple springs 400, 500, 600, 700, and 800 described in more detail hereinafter.

Figure 4:
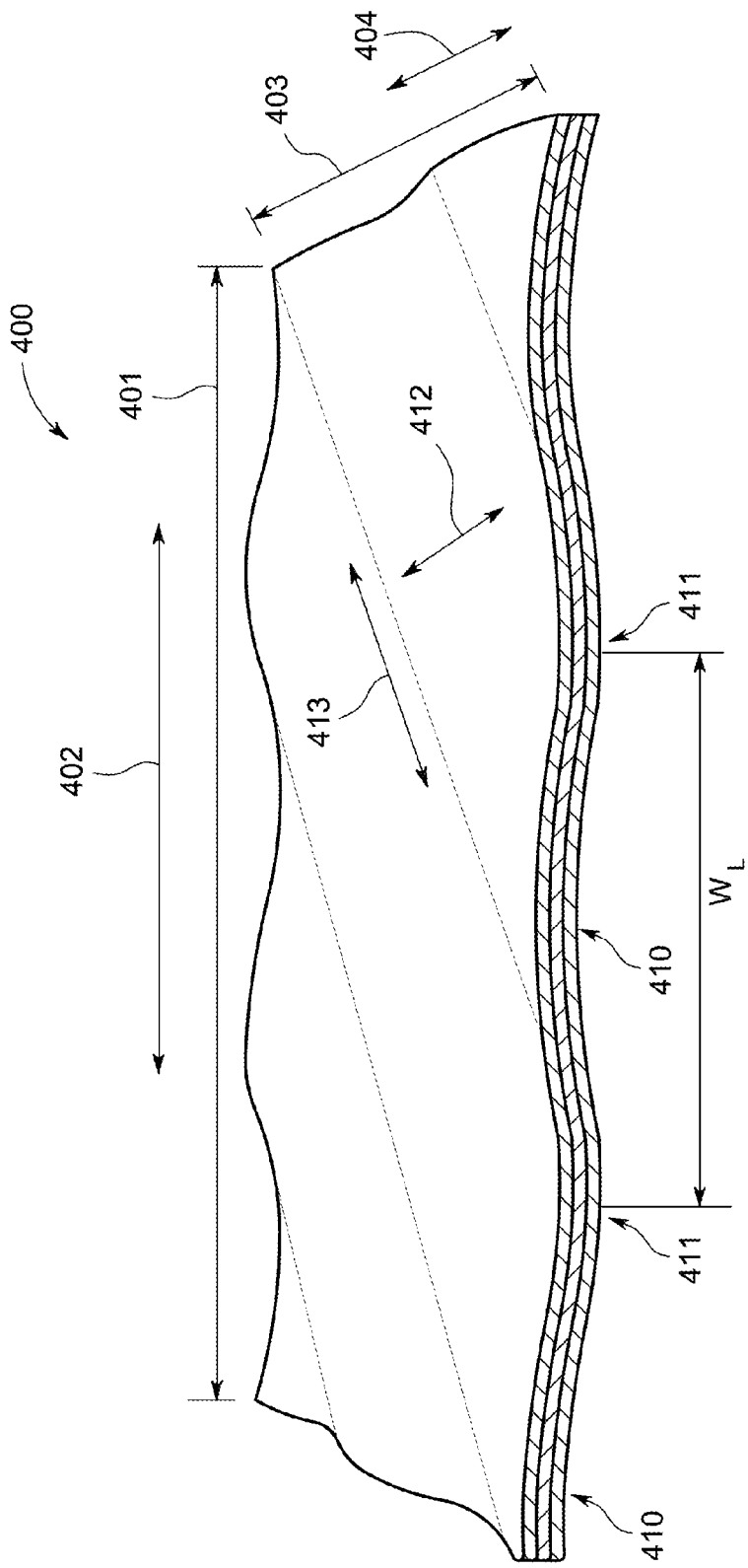
FIG. 4 is a perspective illustration of a ripple spring used within the stator slot of an electric machine, according to an aspect of the present invention.

FIG. 4 illustrates a perspective view of a ripple spring 400 according to an aspect of the present invention. The ripple spring 400 has a length 401 extending along a length axis 402, and a width 403 extending along a width axis 404. The length axis 402 is substantially orthogonal to the width axis 404. The ripple spring 400 also has a substantially sinusoidal surface or shape, and the sinusoidal surface has a wave cycle or wavelength $W_L$. The surface is comprised of a series of alternating peaks 410 and valleys 411, and the wavelength direction or axis 412 may be oriented in a direction about forty five degrees from the length axis 402. The valleys 411 extend along a valley axis 413, which is substantially orthogonal to the wavelength axis 412. However, it is to be understood that the wavelength axis 412 could also be oriented in any suitable direction, including but not limited to, parallel to the length axis, parallel to the width axis or any suitable angle therebetween.

Each layer of the ripple spring 400 may comprise glass fibers or carbon fibers. The glass fibers can be substantially unidirectional glass fibers, E-glass, S-glass, fiberglass or any suitable fiber reinforced polymer made of a plastic matrix reinforced by fine fibers made of glass, although unidirectional electrical grade E-glass is one preferred material. The carbon fiber may be a woven fabric formed by many individual carbon fibers, or any other suitable carbon fiber material or composite.

In some prior known ripple springs having an asymmetrical stack of layers, cracks have developed along the valleys. The asymmetric configuration resulted in uneven internal spring forces that produced higher stress in the outer plys. The uneven internal spring forces were especially problematic in the plys or layers adjacent to layers oriented in the wavelength direction or axis. These cracks can eventually lead to failure of the ripple spring and subsequently to potential failure of the windings.

Accordingly, the ripple spring 400 is formed of one or more layers (or plys) that are laminated and then molded together to form a ripple spring having a symmetrical stack of layers with improved crack resistance and bending strength. The table below compares the approximate bending strength or force at rupture of ripple springs having an asymmetrical stack of layers with the inventive ripple spring having a symmetrical stack of layers. SRS identifies a side ripple spring and TRS identifies a top ripple spring.

TABLE 1

| | Bending Force at Rupture (lbf) | |
| --- | --- | --- |
| | SRS | TRS |
| Asymmetric Ripple Spring | 27-38 | 110 |
| Symmetric Ripple Spring | 54 | 135-145 |
| Symmetric Ripple Spring with carbon fiber | 149 | 154 |

The asymmetric ripple spring had a highest bending force at rupture of about 38 lbf (pound-force), and the inventive symmetric side ripple spring (SRS) had a bending force at rupture of about 54 lbf. The symmetric side ripple spring with carbon fiber had a bending force at rupture of about 149 lbf. A ripple spring having a lower bending strength has a greater probability to crack or malfunction during operation of the electric machine. Field experience has shown that the asymmetric ripple spring has cracked prematurely during service, and this led to unwanted machine shut downs as well as costly repairs. The symmetric ripple spring has increased strength and results in a significant and practical advantage by eliminating or at least greatly reducing the tendency to crack compared to the asymmetric ripple springs. In fact, by changing the order and orientation of each layer, a greater than expected result (i.e., improved bending force) was obtained in the symmetric ripple spring. The bending force can be further increased by the addition of carbon fiber layers.

Figure 5:
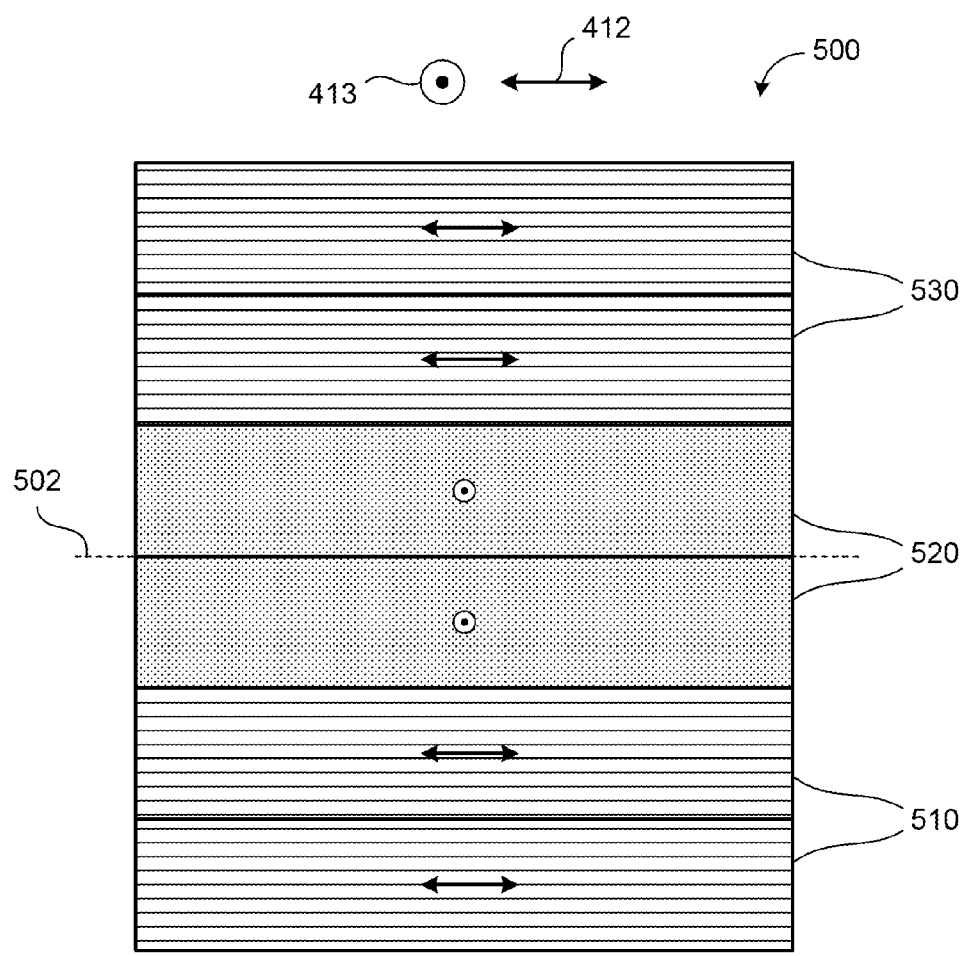
FIG. 5 is a cross-sectional illustration of a multi-layered ripple spring used within the stator slot of an electric machine, according to an aspect of the present invention.

FIG. 5 illustrates a cross-sectional view of a ripple spring 500 having a symmetrical stack of layers resulting in improved bending force or strength. The ripple spring 500 can be formed of one or more bottom layers 510, one or more middle layers 520 and one or more top layers 530. In this configuration, the ripple spring is symmetrical about dashed line 502. Two of each layer is shown, but it is to be understood that one, two or three or more layers could be used for some or all of the various sections. The bottom layers 510 are formed of unidirectional glass fibers and the fibers are oriented substantially along the wavelength axis 412, which is shown going horizontally across the page. The middle layers 520 are also formed of unidirectional glass fibers and these fibers are oriented substantially along the valley axis 413, which is shown going into or out of the page. The top layers 530 are formed of unidirectional glass fibers and the fibers in the top layers are oriented substantially along the wavelength axis 412. Each layer can be formed by impregnating unidirectional glass fabric with a binder material. Multiple layers can be formed into a laminate after drying or partial curing, and each laminate formed could have a thickness ranging from 4 mil to 8 mil. These laminates according to the symmetric design, can thus be molded together to form a uniform and symmetric ripple spring with desired wave cycles. As non-limiting examples only, the impregnating binder material may include epoxy, polyester, polyesterimide, polyamide-imide, epoxy-phenolic, epoxy-Novolac resin, epoxy-polyimide, or combinations thereof, or any other suitable binder material whose thermal ratings are above the operating temperature of an electric machine These impregnating resin binder can be filled with electrically and/or thermally conductive materials in order to enhance the dissipation of accumulated charges and heat on or within surfaces of insulated stator bars to the wall of steel-made slots.

Most cracks appear to form along the valley axis 413, so the ripple spring 500 should be more resistant to cracks by locating the crack oriented or valley oriented layers away from the surface of the ripple spring. The surface could be either the top or bottom surface, as both surfaces are in contact with portions of the electric machine or retention assembly. The ripple spring 500 is formed of a plurality of layers having alternating fiber orientations, and this alternating configuration is important for maintaining the strength of the ripple spring. For example, if all the layers were oriented in the same direction and if a crack formed it would rapidly spread along the entire ripple spring. By alternating the fiber orientations in a specific way and by configuring the layers in a symmetrical fashion, the strength of the ripple spring can be improved as well as its resistance to cracks and crack propagation. As one example, this symmetric side ripple spring 500 has a bending force at rupture of about 54 lbf.

Figure 6:
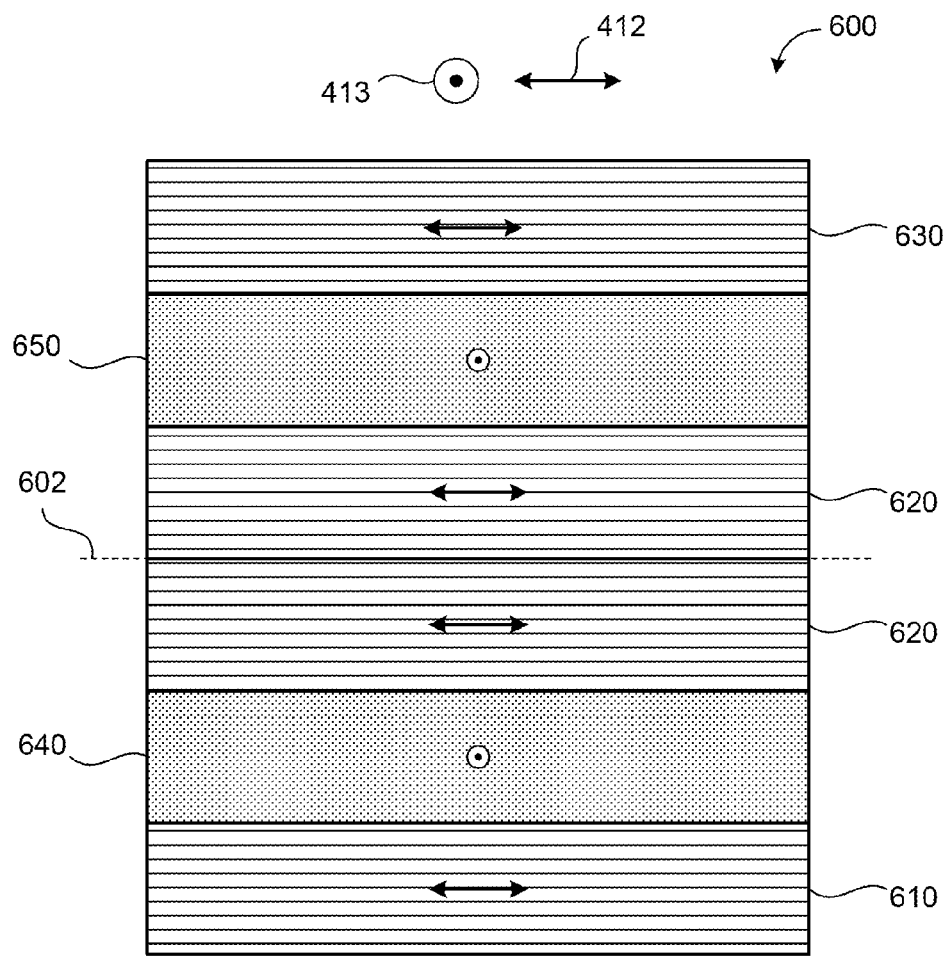
FIG. 6 is a cross-sectional illustration of a multi-layered ripple spring used within the stator slot of an electric machine, according to an aspect of the present invention.

FIG. 6 illustrates a cross-sectional view of a ripple spring 600 having a symmetrical stack of layers. The ripple spring 600 can be formed of one (as shown) or more bottom layers 610, one or more middle layers 620, one or more top layers 630, and a first layer 640 and a second layer 650. However, it is to be understood that one, two or three or more layers could be used for each of the various sections. In this configuration, the ripple spring is symmetrical about dashed line 602. The bottom layer 610, middle layers 620 and top layer 630 are formed of unidirectional glass fibers and the fibers are oriented substantially along the wavelength axis 412. The first layer 640 is located between the bottom layer 610 and the middle layer 620, and the first layer 640 is also formed of unidirectional glass fibers. The fibers in first layer 640 are oriented substantially along the valley axis 413. The second layer 650 is located between the middle layer 620 and the top layer 630, and the second layer 650 is also formed of unidirectional glass fibers. The fibers in second layer 650 are oriented substantially along the valley axis 413. Each layer can be molded to form side ripple springs with time-temperature curing profile of resins known to those skilled in the art.

Figure 7:
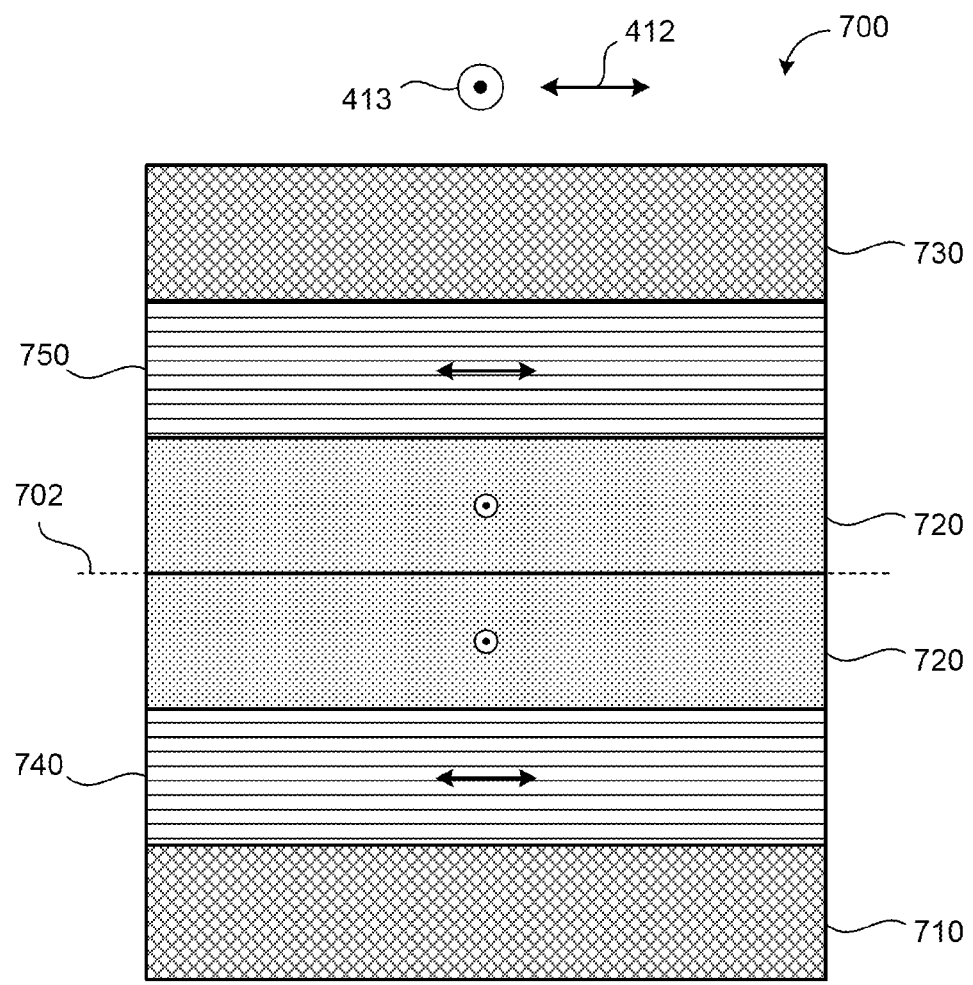
FIG. 7 is a cross-sectional illustration of a multi-layered ripple spring used within the stator slot of an electric machine, according to an aspect of the present invention.

FIG. 7 illustrates a cross-sectional view of a ripple spring 700 having a symmetrical stack of layers. The ripple spring 700 can be formed of one or more carbon fiber bottom layers 710, a first layer 740, one or more middle layers 720, a second layer 750, and one or more carbon fiber top layers 730. However, it is to be understood that one, two or three or more layers could be used for each of the various sections. In this configuration, the ripple spring is symmetrical about dashed line 702. The bottom layer 710 and the top layer 730 are formed of carbon fiber material. The carbon fiber material adds strength to the ripple spring 700. Alternatively, the carbon fiber layers may be combined or replaced with para-aramid synthetic fiber (e.g., Kevlar®, a registered trademark of E. I. du Pont de Nemours and Company), graphite, copper, silver, gold and/or aluminum. The first layer 740 is located between the bottom layer 710 and the middle layer 720, and the first layer is formed of unidirectional glass fibers oriented substantially along the wavelength axis 412. The middle layers 720 are also formed of unidirectional glass fibers and these fibers are oriented substantially along the valley axis 413. The second layer 750 is located between the middle layer 720 and the top layer 730, and the second layer 750 is formed of unidirectional glass fibers oriented substantially along the wavelength axis 412. Each layer can be bonded to adjacent layers with any suitable epoxy or binder material.

Figure 8:
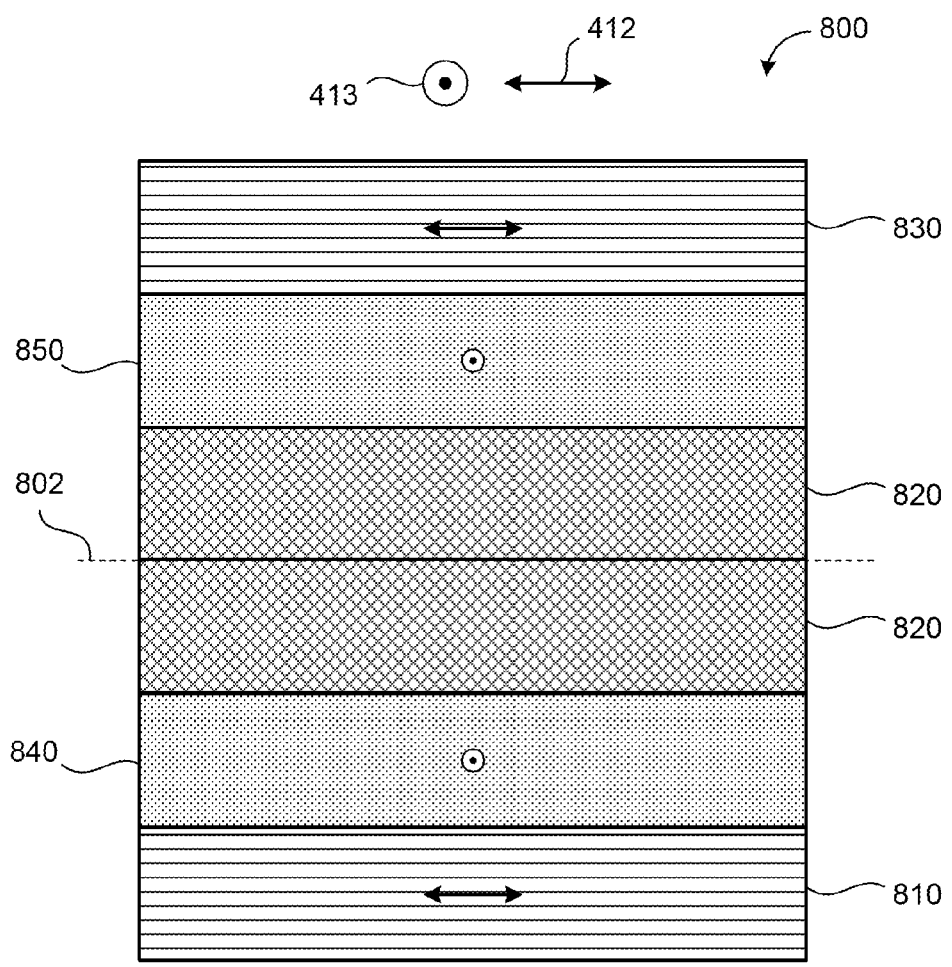
FIG. 8 is a cross-sectional illustration of a multi-layered ripple spring used within the stator slot of an electric machine, according to an aspect of the present invention.

FIG. 8 illustrates a cross-sectional view of a ripple spring 700 having a symmetrical stack of layers. The ripple spring 800 can be formed of one or more bottom layers 810, a first layer 840, one or more carbon fiber middle layers 820, a second layer 850, and one or more top layers 830. However, it is to be understood that one, two or three or more layers could be used for each of the various sections. In this configuration, the ripple spring is symmetrical about dashed line 802. The bottom layer 810, first layer 840, second layer 850 and top layer 830 are formed of unidirectional glass fibers. The fibers in the bottom layer 810 and the top layer 830 are oriented substantially along the wavelength axis 412. The fibers in the first layer 840 and the second layer 850 are oriented substantially along the valley axis 413. The middle layers 820 are formed of carbon fiber material, and the carbon fiber material adds strength to the ripple spring 800. Each layer can be bonded to adjacent layers with any suitable epoxy or binder material.

The ripple spring may be configured to be electrically and thermally conducting in side ripple spring applications whose surface resistivity can be as low as 15,000 to 750,000 ohms/in$^2$, and electrically insulating and/or thermally conductive in top ripple spring applications. Electrically conducting or semiconducting side ripple springs may comprise the electrically securing element in closing the side slot in generators. In addition, the side ripple springs may include or be infused with conductive or semi-conductive material, such as but not limited to, graphite, metal, metal alloys, conductive or semiconductive fibers or conductive or semiconductive powders, conductive or semiconductive polymers, conductive or semiconductive elastomers and conductive or semiconductive plastics whose thermal ratings or thermal classification is above the operating temperature of an electric machine. Electrically insulating top ripple springs may be preferred and electrically insulating materials may be used to form the top ripple springs. However, in some applications electrically and/or thermally conductive or semiconductive materials may be used in the fabrication of top ripple springs and in these applications the conductive or semiconductive material may be located near the middle of the spring so as to reduce direct contact with adjacent surfaces.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A ripple spring, the ripple spring having a length extending along a length axis and a width extending along a width axis, the length axis being substantially orthogonal to the width axis, the ripple spring including a substantially sinusoidally shaped surface having a wavelength extending along a wavelength axis, the sinusoidally shaped surface having one or more valleys extending along a valley axis, the valley axis substantially orthogonal to the wavelength axis, the ripple spring comprising:
   one or more layers laminated together, the one or more layers forming a symmetrical stack, the one or more layers further comprising one or more bottom layers, one or more middle layers and one or more top layers;
   the one or more bottom layers, the one or more middle layers and the one or more top layers formed substantially of unidirectional fibers;
   wherein, the unidirectional fibers of the one or more bottom layers and the one or more top layers are oriented substantially along the wavelength axis; and
   wherein, the unidirectional fibers of the one or more middle layers are oriented substantially along the valley axis.

2. The ripple spring of claim 1, wherein the one or more bottom layers, the one or more middle layers and the one or more top layers comprise a binder material, the binder material comprising one or combinations of:
   epoxy, polyester, polyesterimide, polyamide-imide, epoxy-phenolic, epoxy-novolac resin, and epoxy-polyimide.

3. The ripple spring of claim 2, wherein the binder material comprises at least one or combinations of:
   an electrically conductive material, and a thermally conductive material.

4. The ripple spring of claim 1, wherein the wavelength axis is parallel to the length axis.

5. The ripple spring of claim 1, wherein the wavelength axis is about forty five degrees from the length axis.

6. The ripple spring of claim 1, further in combination with:
   an electric machine having a rotor and a stator, the stator having a stator core with a plurality of stator slots;
   a plurality of stator bars contained substantially within the plurality of stator slots; and
   wherein the ripple spring is located between at least one of the plurality of stator bars and the stator core.

7. The ripple spring of claim 1, further in combination with:
   an electric machine having a rotor and a stator, the stator having a stator core with a plurality of stator slots;

a plurality of stator bars contained substantially within the plurality of stator slots; and wherein the ripple spring is located between at least one of the plurality of stator bars and a stator wedge.

8. A ripple spring, the ripple spring having a length extending along a length axis and a width extending along a width axis, the length axis being substantially orthogonal to the width axis, the ripple spring including a substantially sinusoidally shaped surface having a wavelength extending along a wavelength axis, the sinusoidally shaped surface having one or more valleys extending along a valley axis, the valley axis substantially orthogonal to the wavelength axis, the ripple spring comprising:

one or more layers laminated together, the one or more layers forming a symmetrical stack, the one or more layers further comprising one or more bottom layers, one or more middle layers and one or more top layers;

the one or more bottom layers, the one or more middle layers and the one or more top layers formed substantially of unidirectional fibers;

wherein, the unidirectional fibers of the one or more bottom layers, the one or more middle layers and the one or more top layers are oriented substantially along the wavelength axis;

a first layer located between the one or more bottom layers and the one or more middle layers, the first layer formed substantially of unidirectional fibers, the unidirectional fibers of the first layer oriented substantially along the valley axis; and a second layer located between the one or more middle layers and the one or more top layers, the second layer formed substantially of unidirectional fibers, the unidirectional fibers of the second layer oriented substantially along the valley axis.

9. The ripple spring of claim 8, wherein the one or more bottom layers, the first layer, the one or more middle layers, the second layer and the one or more top layers comprise a binder material, the binder material comprising one or combinations of:

epoxy, polyester, polyesterimide, polyamide-imide, epoxy-phenolic, epoxy-novolac resin, and epoxy-polyimide.

10. The ripple spring of claim 9, wherein the binder material comprises at least one or combinations of:

an electrically conductive material, and a thermally conductive material.

11. The ripple spring of claim 8, wherein the wavelength axis is parallel to the length axis.

12. The ripple spring of claim 8, wherein the wavelength axis is about forty five degrees from the length axis.

13. The ripple spring of claim 8, further in combination with:

an electric machine having a rotor and a stator, the stator having a stator core with a plurality of stator slots;

a plurality of stator bars contained substantially within the plurality of stator slots; and wherein the ripple spring is located between at least one of the plurality of stator bars and the stator core.

14. The ripple spring of claim 8, further in combination with:

an electric machine having a rotor and a stator, the stator having a stator core with a plurality of stator slots;

a plurality of stator bars contained substantially within the plurality of stator slots; and wherein the ripple spring is located between at least one of the plurality of stator bars and a stator wedge.

15. A ripple spring, the ripple spring having a length extending along a length axis and a width extending along a width axis, the length axis being substantially orthogonal to the width axis, the ripple spring including a substantially sinusoidally shaped surface having a wavelength extending along a wavelength axis, the sinusoidally shaped surface having one or more valleys extending along a valley axis, the valley axis substantially orthogonal to the wavelength axis, the ripple spring comprising:

one or more layers laminated together, the one or more layers forming a symmetrical stack, the one or more layers further comprising one or more bottom layers, one or more middle layers and one or more top layers;

the one or more bottom layers and the one or more top layers formed substantially of carbon fibers;

the one or more middle layers formed substantially of unidirectional fibers, the unidirectional fibers of the one or more middle layers oriented substantially along the valley axis;

a first layer located between the one or more bottom layers and the one or more middle layers, the first layer formed substantially of unidirectional fibers, the unidirectional fibers of the first layer oriented substantially along the wavelength axis; and a second layer located between the one or more middle layers and the one or more top layers, the second layer formed substantially of unidirectional fibers, the unidirectional fibers of the second layer oriented substantially along the wavelength axis.

16. The ripple spring of claim 15, wherein the first layer, the one or more middle layers and the second layer comprise a binder material, the binder material comprising one or combinations of:

epoxy, polyester, polyesterimide, polyamide-imide, epoxy-phenolic, epoxy-novolac resin, and epoxy-polyimide.

17. The ripple spring of claim 16, wherein the binder material comprises at least one or combinations of:

an electrically conductive material, and a thermally conductive material.

18. The ripple spring of claim 15, wherein the wavelength axis is parallel to the length axis.

19. The ripple spring of claim 15, wherein the wavelength axis is about forty five degrees from the length axis.

20. The ripple spring of claim 15, further in combination with:

an electric machine having a rotor and a stator, the stator having a stator core with a plurality of stator slots;

a plurality of stator bars contained substantially within the plurality of stator slots; and wherein the ripple spring is located between at least one of the plurality of stator bars and the stator core.

21. The ripple spring of claim 15, further in combination with:

an electric machine having a rotor and a stator, the stator having a stator core with a plurality of stator slots;

a plurality of stator bars contained substantially within the plurality of stator slots; and wherein the ripple spring is located between at least one of the plurality of stator bars and a stator wedge.

22. A ripple spring, the ripple spring having a length extending along a length axis and a width extending along a width axis, the length axis being substantially orthogonal to the width axis, the ripple spring including a substantially sinusoidally shaped surface having a wavelength extending along a wavelength axis, the sinusoidally shaped surface having one or more valleys extending along a valley axis, the valley axis substantially orthogonal to the wavelength axis, the ripple spring comprising:
- one or more layers laminated together, the one or more layers forming a symmetrical stack, the one or more layers further comprising one or more bottom layers, one or more middle layers and one or more top layers;
- the one or more bottom layers and the one or more top layers formed substantially of unidirectional fibers, the unidirectional fibers of the one or more bottom layers and the one or more top layers oriented substantially along the wavelength axis;
- the one or more middle layers formed substantially of carbon fibers;
- a first layer located between the one or more bottom layers and the one or more middle layers, the first layer formed substantially of unidirectional fibers, the unidirectional fibers of the first layer oriented substantially along the valley axis; and
- a second layer located between the one or more middle layers and the one or more top layers, the second layer formed substantially of unidirectional fibers, the unidirectional fibers of the second layer oriented substantially along the valley axis.

23. The ripple spring of claim 22, wherein the one or more bottom layers, the first layer, the second layer and the one or more top layers comprise a binder material, the binder material comprising one or combinations of: epoxy, polyester, polyesterimide, polyamide-imide, epoxy-phenolic, epoxy-novolac resin, and epoxy-polyimide.

24. The ripple spring of claim 23, wherein the binder material comprises at least one or combinations of:
- an electrically conductive material, and a thermally conductive material.

25. The ripple spring of claim 22, wherein the wavelength axis is parallel to the length axis.

26. The ripple spring of claim 22, wherein the wavelength axis is about forty five degrees from the length axis.

27. The ripple spring of claim 22, further in combination with:
- an electric machine having a rotor and a stator, the stator having a stator core with a plurality of stator slots;
- a plurality of stator bars contained substantially within the plurality of stator slots; and
- wherein the ripple spring is located between at least one of the plurality of stator bars and the stator core.

28. The ripple spring of claim 22, further in combination with:
- an electric machine having a rotor and a stator, the stator having a stator core with a plurality of stator slots;
- a plurality of stator bars contained substantially within the plurality of stator slots; and
- wherein the ripple spring is located between at least one of the plurality of stator bars and a stator wedge.

* * * * *